(12) United States Patent
Ray et al.

(10) Patent No.: US 10,920,972 B2
(45) Date of Patent: Feb. 16, 2021

(54) HYBRID LIGHT EMITTING DIODE TUBE

(71) Applicant: LEDVANCE LLC, Wilmington, MA (US)

(72) Inventors: Soumya Kanta Ray, Methuen, MA (US); Anil Jeswani, Acton, MA (US); Robert Harrison, North Andover, MA (US)

(73) Assignee: LEDVANCE LLC, Wilmington, MA (US)

(*) Notice: Subject to any disclaimer, the term of this patent is extended or adjusted under 35 U.S.C. 154(b) by 0 days.

(21) Appl. No.: 16/404,129

(22) Filed: May 6, 2019

(65) Prior Publication Data

US 2019/0338934 A1 Nov. 7, 2019

Related U.S. Application Data

(60) Provisional application No. 62/667,935, filed on May 7, 2018.

(51) Int. Cl.
F21K 9/27 (2016.01)
F21V 23/04 (2006.01)
F21V 23/00 (2015.01)
F21V 23/02 (2006.01)
H05B 45/3578 (2020.01)
F21Y 115/10 (2016.01)

(52) U.S. Cl.
CPC ............... F21V 23/04 (2013.01); F21K 9/27 (2016.08); F21V 23/005 (2013.01); F21V 23/026 (2013.01); H05B 45/3578 (2020.01); F21Y 2115/10 (2016.08)

(58) Field of Classification Search
CPC ........ F21K 9/27; H05B 45/3578; H05B 45/00
USPC .................................................. 362/249.06
See application file for complete search history.

(56) References Cited

U.S. PATENT DOCUMENTS

| 2013/0342128 | A1* | 12/2013 | Chen | H05B 45/37 |
| | | | | 315/228 |
| 2015/0181661 | A1* | 6/2015 | Hsia | H05B 45/00 |
| | | | | 315/160 |
| 2017/0181239 | A1* | 6/2017 | Xiong | F21K 9/27 |
| 2018/0112837 | A1* | 4/2018 | Sadwick | F21K 9/278 |

* cited by examiner

Primary Examiner — Christopher M Raabe
(74) Attorney, Agent, or Firm — Tutunjian & Bietto PC

(57) ABSTRACT

A lamp including a light source having at least one string of light emitting diodes on a printed circuit board present within a tube body; and end caps having a G13 pin layout on each end of the tube body. The lamp may further include an electrical isolation switch mounted on at least one of the end caps, wherein the electrical isolation switch provides shock protection from the lamp when installed into a ballast free fixture. The lamp may further include driver electronics having a filament detector portion provided by a passive resistance capacitor (RC) circuit that simulates the filament load of a fluorescent lamp when installed into a ballast containing fixture.

20 Claims, 6 Drawing Sheets

HYBRID LIGHT EMITTING DIODE TUBE

TECHNICAL FIELD

The present disclosure generally relates to lighting, and more particularly to lamp tubes used with light sources including light emitting diodes (LEDs).

BACKGROUND

Fluorescent light fixtures have been a popular form of lighting for many decades. A fluorescent lighting fixture includes one or more fluorescent tubes, with each tube having an end cap on each end of a tube. Lighting systems based on LED light sources are a fairly new technology in the lighting field. LED's are desirable because they have no mercury, and therefore, are more environment friendly. LED's also have a much longer lifetime, and use less power than fluorescent tubes of equivalent output.

SUMMARY

A hybrid light emitting diode retrofit tube lamp is provided that can be operated in a fixture for at least lamps, such as a type A T8 lamp, a type B T8 lamp, and a T12 lamp. In one embodiment, the lamp includes a light source including at least one string of light emitting diodes on a printed circuit board present within a tube body, and end caps having pin contacts on each end of the tube body. An electrical isolation switch may be mounted on at least one of the end caps. The electrical isolation switch provides shock protection from the lamp when installed into a ballast free fixture. The lamp may further include driver electronics including a filament detector portion provided by a passive resistance capacitor (RC) circuit that simulates the filament load of a fluorescent lamp when installed into a ballast containing fixture.

In another embodiment, the retrofit tube lamp may include a light source including at least one string of light emitting diodes within a tube body, and end caps having contacts with a G13 pin layout at each end of the tube body. The lamp may further include an electrical isolation switch mounted on at least one of the end caps, wherein the electrical isolation switch provides shock protection from the lamp when installed into a ballast free fixture for a type B T8 lamp. The lamp may also include driver electronics including a filament detector portion provided by a passive resistance capacitor (RC) circuit that simulates the filament load of a fluorescent lamp when installed into a ballast containing fixture for a T12 lamp or a type A T8 lamp.

In yet another embodiment, the lamp may include a light source including at least one string of light emitting diodes on a printed circuit board present within a tube body, and end caps having pin contacts on each end of the tube body. An electrical isolation switch may be mounted on at least one of the end caps. The electrical isolation switch provides shock protection from the lamp when installed into a ballast free fixture. The lamp may further include driver electronics including a filament detector portion provided by a passive resistance capacitor (RC) circuit, in which when installed into a ballast containing fixture provides a high startup voltage and low impedance following start up during normal operation.

BRIEF DESCRIPTION OF THE DRAWINGS

The following description will provide details of embodiments with reference to the following figures wherein.

DETAILED DESCRIPTION

Figure 1:
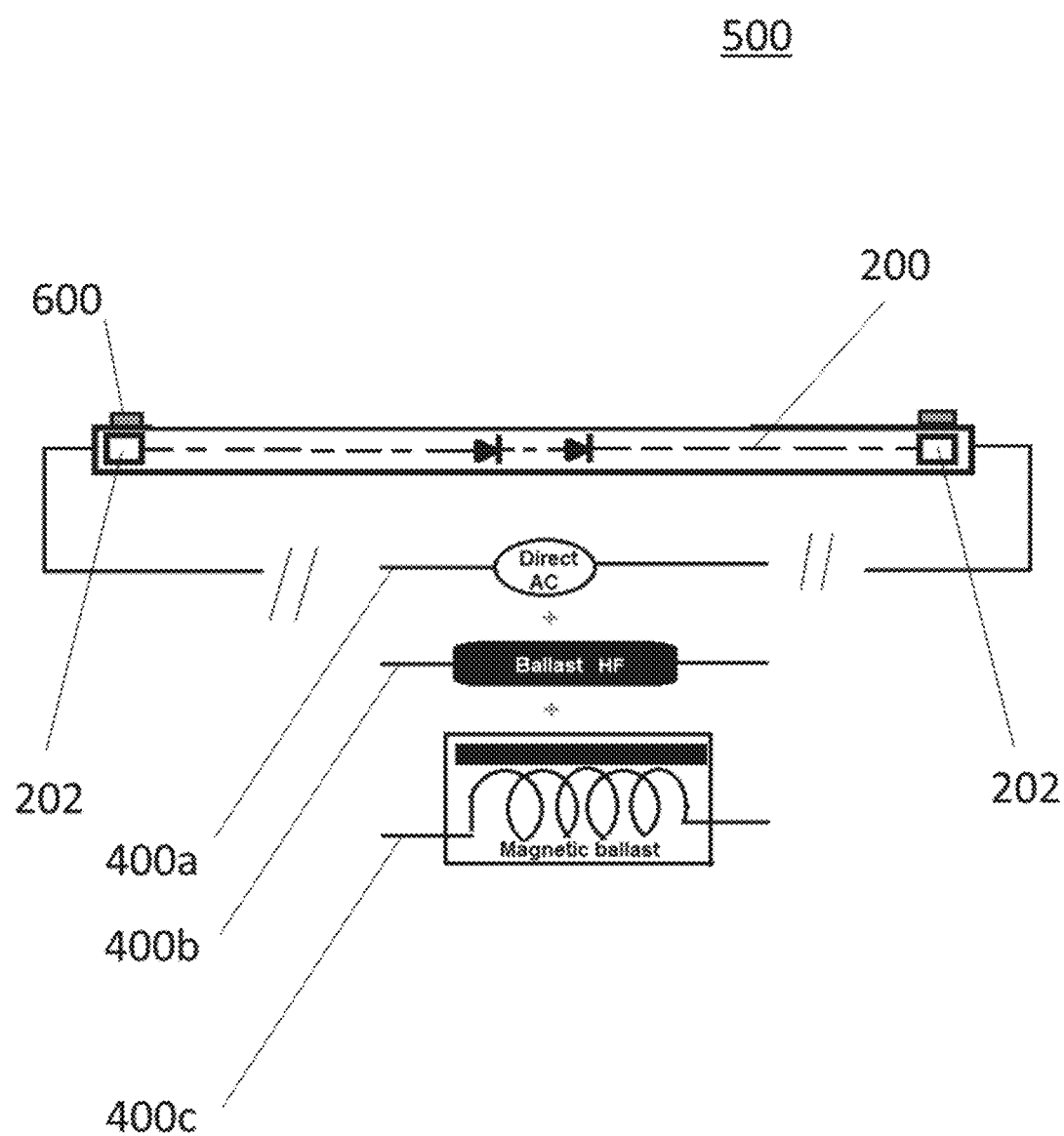
FIG. 1 is an illustration depicting one embodiment of a light emitting diode (LED) tube that is suitable for three lamps types, i.e., type A T8 lamp, type B T8 lamp and T12 lamp.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

As light emitting diode (LED) light sources become a more attractive solution to lighting in fluorescent type lighting fixtures, glass tubes have been considered for light emitting diode (LED) lighting. There are a number of different types and standards for tube lights. Some examples of standards for tube lighting include Type A T8 lamp, Type B T8 lamp, and T12 magnetic and electronic ballast lamps. These types of tube lighting employ a G13 socket. The G13 pin type is a double pin design, in which the center to center distance between the two pins is 0.50 inches (12.7 mm), and the din diameter is 0.093 inches (2.35 mm). In addition to T8 and T12 tube types, the G13 socket design is also suitable for T10 type tube lamps.

The structures provided herein provide a hybrid LED tube lamp for use with both T8 and/or T12 lamp sizes, or any other lamp size that employs a G13 socket. For example, the designs of the present disclosure flexibility provided herein allow an installer of the lamps to use the same LED tube to replace each of the following lamp types: 1) Type A T8 lamp, 2) Type B T8 lamp and/or 3) T12 magnetic and electronic ballast lamps. The structures described herein are scalable. For example, the lamp designs described herein can be adapted for either 2', 3', 4' or 8' lamp sizes.

Prior to the lamp designs of the present disclosure, depending on the ballast installed in the fixture, e.g., magnetic, high frequency or no ballast, the user had to acquire the specific lamp type design for the specific lamp fixture. For example, if the fixture in which the replacement lamp is to be installed already has high frequency (HF) ballast installed then the installer has to choose the Type A LED T8

Tube that is compatible with T8 HF ballast. In another example, if T12 magnetic ballast are installed in an application, the installer wishing to install a replacement lamp has to choose the LED T8 Lamp that is compatible with T12 magnetic ballast. In another example, if the lamp fixture in which the installer wants to replace lamp does not employ a ballast, i.e., a ballast free application, then Type B LED T8 tube lamps that use direct line voltage of 120V/277V can used.

Each of these 3 lamp types have different lamp designs (driver) to work with these specific ballasts.

The lamp designs described herein enables compatibility to these three types of lamps, i.e., 1) Type A T8 lamp, 2) Type B T8 lamp and/or 3) T12 magnetic and electronic ballast lamps, and offers a lot of flexibility to the installer of what type of replacement lamps can be employed in a fixture employing a G13 socket design, i.e., a socket design for accepting a G13 pin design. The lamp designs described herein have the following advantages: 1) the LED tube lamp of the present disclosure allows replacement of either T8 or T12 Florescent lamp types; T8 or T12 can be used in the same fixture as they both use the same G13 Lamp socket; 2) the LED tube lamp of the present disclosure does not need an external starter while operating with a magnetic ballast; 3) the LED tube lamp of the present disclosure allows flexibility to the installer by accommodating and enabling usage on 3 major installation conditions; and 4) the LED tube lamp of the present disclosure simplifies logistics, supply chain and minimizes inventory levels. The methods and structures that are provided herein are now described with more detail with reference to FIGS. 1-6.

FIG. 1 depicts one embodiment of a light emitting diode (LED) tube lamp 500 that is suitable for three lamp fixture types, i.e., type A T8 lamp, type B T8 lamp and T12 lamp that use a G13 Lamp socket. More specifically, in some embodiments, the LED tube lamp 500 can be used or installed in any type of fixture that requires a Type-A LED T8 compatible ballast, such as a traditional T8 IS (instant start) ballast, or a T8 PS (programmable start)(collectively identified by reference number 400*b*); Type-B LED T8, which is ballast free or no ballast (direct ACXidentified by reference number 400*a*); and T12 magnetic ballast (identified by reference number 400*c*). Further, the LED tube lamp 500 is compatible in application as a replacement of traditional florescent lamp.

Referring to FIGS. 1-4, in some embodiments, to provide an LED tube lamp 500 for a retrofit application as a replacement of a florescent type lamp, the LED tube lamp 500 may include an LED driver 202, a mechanical safety switch 600, and at least one string of light emitting diodes (LEDs) 201. The LED driver 202 is mounted inside the two end caps 301*a*, 301*b*. In some embodiments, the LED driver 202 is a switch mode power supply design. In some embodiments, a two stage design may be employed to get better efficiency while operating with a Magnetic ballast.

Referring to FIGS. 1-4, in some embodiments, the LED tube lamp 100 includes a mechanical safety switch 600. The mechanical safety switch 600 can be provided on the LED tube lamp 500 to avoid electric shock when connected as a double ended configuration especially during the direct line voltage or no ballast application, e.g., during installation of the LED tube lamp 500 as a replacement for a type-B LED T8, which is ballast free or no ballast (direct ACXidentified by reference number 400). A string of LEDs 201 are mounted on a PCB 203 which is mounted on inside surface of the glass tube 100. The lamp 500 can be either T8 or T12 type, i.e., have end caps 300*a*, 300*b* with a G13 pin design. Further the lamp 100 can either be 2', 3', 4' or 8' in length.

The glass tube body 100 is composed of a glass composition. The term "glass" denotes the material of the lamp tube 100 is composed of an amorphous solid material. The glass of the lamp tube body 100 may be any of various amorphous materials formed from a melt by cooling to rigidity without crystallization, such as a transparent or translucent material composed of a mixture of silicates. In some embodiments, the glass composition used for the glass tube body 100 is a soda lime silicate glass. In one example, the glass composition for the soda lime silicate glass that provides the glass of the glass tube body 100 contains 60-75% silica, 12-18% soda, and 5-12% lime. In some other examples, such as in high temperature applications, the glass composition used for the glass lamp tube 100 may be a borosilicate glass. Borosilicate glass is a silicate glass having at least 5% of boric oxide in its composition. It is noted that the above glass compositions are provided for illustrative purposes only, and are not intended to limit the glass tube body 100 to only the compositions that are described above, as any glass composition is suitable for use with the glass tube body 100.

Figure 3:
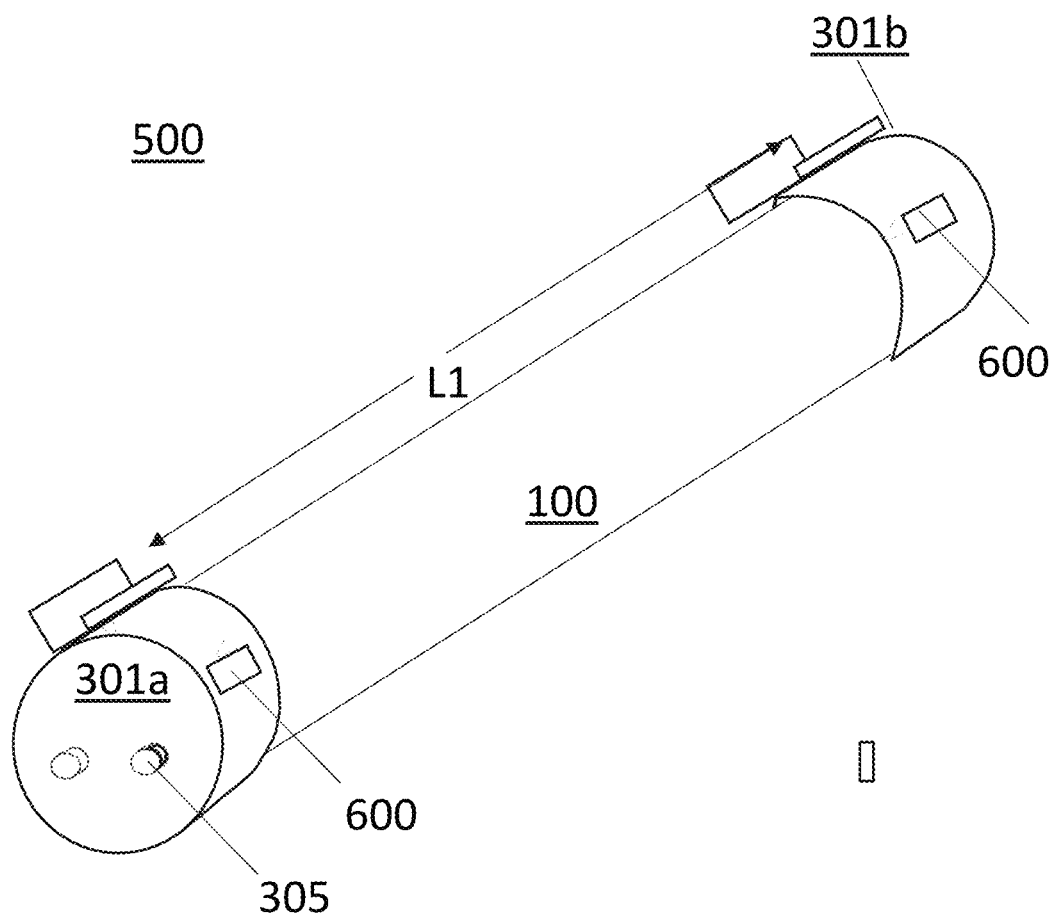
FIG. 3 is a perspective view of a light emitting diode (LED) tube, in accordance with one embodiment of the present disclosure.
Figure 4:
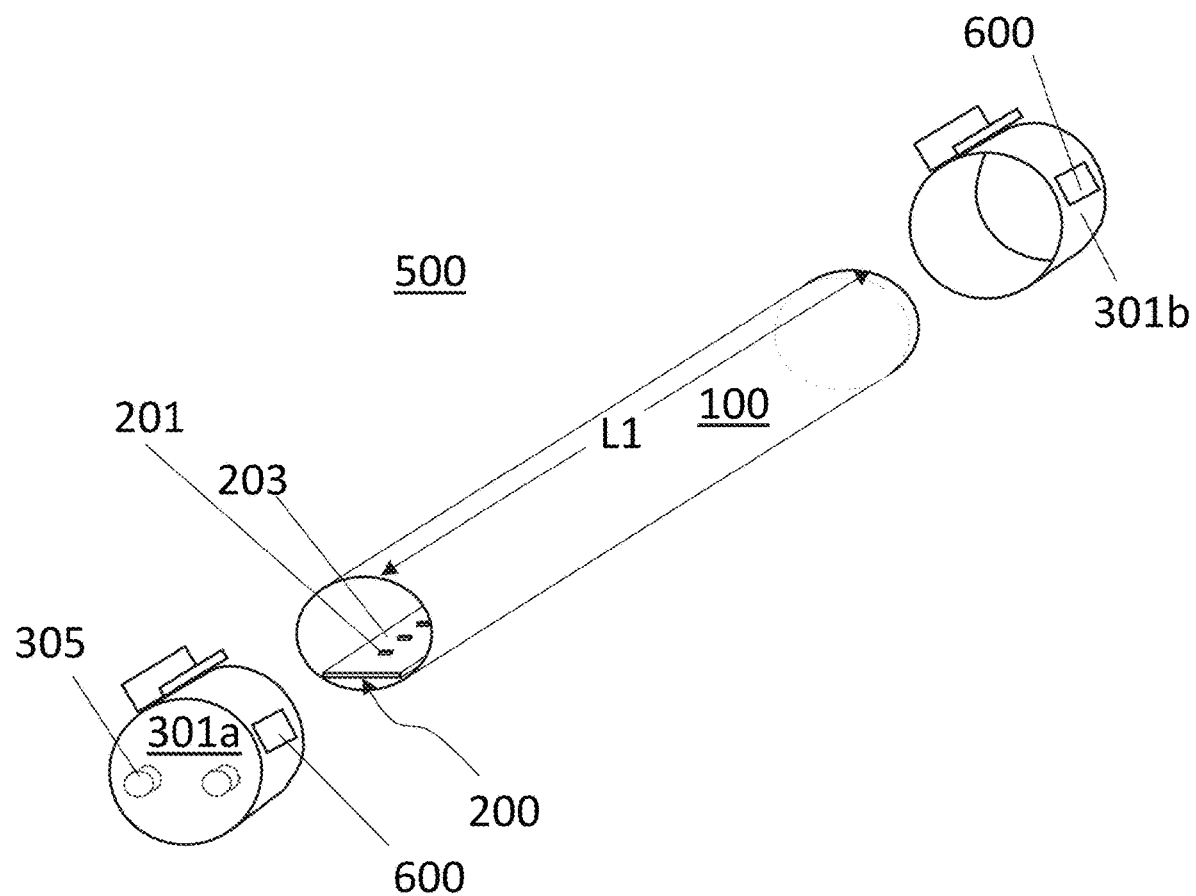
FIG. 4 is a perspective exploded view of the light emitting diode (LED) tube that is depicted in FIG. 3.

Referring to FIGS. 3 and 4, in some embodiments, the glass tube body 100 has a cross-sectional geometry that is perpendicular to a length L1 of the glass tube body 100 with a substantially cylindrical perimeter defined by a sidewall of the glass tube body 100 enclosing a hollow interior for housing a light source. The length L1 of the glass tube body 100, 100' extends from a first end of the glass tube body 100 for engagement by a first end cap 300*a* to a second end of the glass tube body 100 for engagement of a second end cap 300*b*. The length L1 of glass tube body 100 is greater than a width W1 (diameter) of the glass tube body 100. In some embodiments, the length L1 of the glass tube body 100 may range from 5" to 100", and the width W1, i.e., diameter, of the glass tube body 100 may range from 0.5" to 2.0". In one embodiment, the thickness T1 of the glass sidewall for the glass tube body 100 may range from 0.5 mm to 1.1 mm.

The dimensions, i.e., length L1 and width W1, of the glass tube body 100 may be selected to be consistent with the standard sizes of T8 and T12 fluorescent type lamps. For example, the length L1 and width W1 of the glass tube body 100, 100' may be selected to be consistent with the T8 standard for fluorescent type lamps. In this example, the glass tube body 100 can have a width W1 (diameter) that is equal to 8/8", i.e., 1.0", and a length L1 that can be equal to 12", 24", 36", 48" or 60". In yet another example, the length L1 and width W1 of the glass tube body 100 may be selected to be consistent with the T12 standard for fluorescent type lamps. In this example, the glass tube body 100 can have a width W1 (diameter) that is equal to 12/8", i.e., 1.5", and a length L1 that can be equal to 12", 24", 36", 48" or 60".

Figure 2:
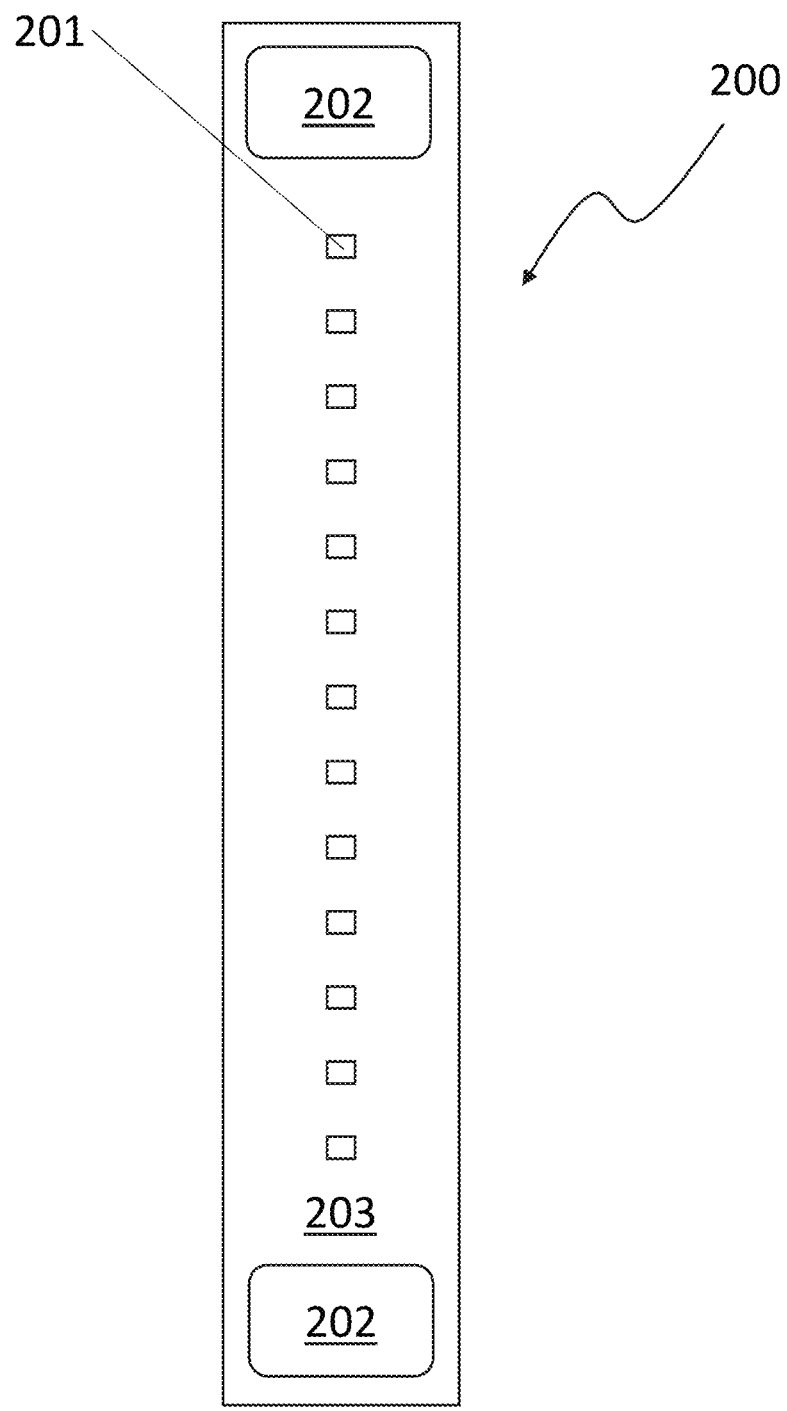
FIG. 2 is a top down view of a light source including a plurality of light emitting diodes (LEDs) that may be used in an light emitting diode (LED) tube, in accordance with one embodiment of the present disclosure.

Referring to FIGS. 1, 2 and 4, the lamp 500 further includes a string of LEDs 201 are mounted on a PCB 203 which is mounted on inside surface of the glass tube 100 with the help of glue or adhesive material. The at least one string of LEDs 201 provides the light source 200 for the LED tube lamp 500. The light source 200 is provided by a light emitting diode (LED) 201 and the substrate 203 is a circuit board, e.g., printed circuit board (PCB), on which the LEDs 201 are mounted as surface mount devices (SMDs). Although other light sources and substrates are suitable for use with the glass tube body 100 that is described herein in providing a lamp 500, the light source 200 is specifically referred to as having light emitting diodes 201, and the substrate 203 is hereafter referred to as a circuit board 203, e.g., printed circuit board. For example, in addition to semiconductor type light emitting diodes (LEDs), the light source may be organic light emitting diodes, laser diodes or any like light source.

FIG. 2 is a top down view of a light source 200 that can be housed within the glass tube body 100, in which the light source 200 includes a plurality of light emitting diodes (LEDs) 201, e.g., surface mount device (SMD) light emitting diodes (LED), that are present on a circuit board 203, e.g., printed circuit board. A light emitting diode (LED) 201 is a light source that can be a semiconductor device that emits visible light when an electric current passes through it. The LEDs 201 of the light source 200 can include at least one LED 201, a plurality of series-connected or parallel-connected LEDs 201, or an LED array 201. At least one LED array for the light source 200 can include a plurality of LED arrays. For example, the LEDs 201 may also be arranged in a single column that extends along a majority of the length of the circuit board 203.

Any type of LED may be used in the LEDs 201 of the light source 200. For example, the LEDs 201 of the light source 200 can be semiconductor LEDs, organic light emitting diodes (OLEDs), semiconductor diodes that produce light in response to current, light emitting polymers, electroluminescent strips (EL) or the like. In one example, the LEDs 201 can be mounted to the circuit board 203 by solder, or other engagement mechanisms. In some examples, the LEDs 201 are provided by a plurality of surface mount discharge (SMD) light emitting diodes (LED) arranged in a plurality of lines on the circuit board 203.

In some embodiments, the LEDs 201 of the light source 200 can produce white light. However, LEDs 201 that produce blue light, purple light, red light, green light, ultra-violet light, near ultra-violet light, or other wavelengths of light can be used in place of white light emitting LEDs 201. In some embodiments, the emission wavelengths for the LEDs 201 of the light source 200 can range from approximately 400 nm to approximately 470 nm, or the emission wavelengths for the LEDs 201 of the light source 200 can range from approximately 300 nm to approximately 400 nm.

The number of LEDs 201 for the light source 200 can be a function of the desired power of the lamp 500 and the power of the LEDs 201. For example, for a 48" lamp 500, the number of LEDs 201 that are present on the circuit board 203 of the light source can vary from about 5 LEDs 201 to about 400 LEDs 201, such that the lamp 500 outputs approximately 500 lumens to approximately 3,000 lumens.

The LEDs 201 for the light source 200 can be mounted on a circuit board 203, such as a printed circuit board (PCB). A printed circuit board (PCB) mechanically supports and electrically connects electronic components, such as the LEDs 201 and the driving electronics 202, using conductive tracks, pads and other features etched from copper sheets laminated onto a non-conductive substrate. The printed circuit board 203 is typically a composed of a dielectric material. For example, the circuit board may be composed of fiber-reinforced plastic (FRP) (also called fiber-reinforced polymer, or fiber-reinforced plastic) is a composite material made of a polymer matrix reinforced with fibers. The fibers are usually glass, carbon, aramid, or basalt. The polymer is usually an epoxy, vinyl ester, or polyester thermosetting plastic, though phenol formaldehyde resins are still in use. In some embodiments, the printed circuit board (PCB) is composed of a composite consistent with the above description that is called FR-4. Further, the printed circuit board material can be a metal core printed circuit board for better thermal conduction. The printed circuit board 203 is not limited to the example shown in the figures. The printed circuit board 203 may be made in one piece or in longitudinal sections joined by electrical bridge connectors.

Still referring to FIG. 2, the printed circuit board 203 may further include an internal built in ballast, i.e., LED driver 202, and printed circuitry providing electrical communication between the ballast and the LEDs 201, e.g., surface mount discharge (SMD) light emitting diodes (LED). The LED driver 202 is an electrical device which regulates the power to the LED 201, or a string (or strings) of LEDs 201. In some embodiments, the LED driver 202 responds to the changing needs of the LEDs 201, or LED circuit, by providing a constant current to the LED 201 as its electrical properties change with temperature. In some embodiments, an LED driver 202 is a self-contained power supply which has outputs that are matched to the electrical characteristics of the LED or LEDs 201. In some embodiments, the LED driver 202 may offer dimming by means of pulse width modulation circuits and may have more than one channel for separate control of different LEDs or LED arrays 201. The current to the LED 201 is maintained constant by the LED driver 202 in spite of change in input voltage or change in temperature.

Referring to FIGS. 3 and 4, in some embodiments, once the light source 200 is positioned within the glass tube body 100, end caps 300a, 300b may be positioned on each end of the glass tube body 100 having electrical contacts for communication between a lamp fixture and the LED driver 202 of the light source 200, hence providing power to the lamp 500. In some embodiments, each of the end caps 300a are composed of a polymeric material, such as silicone; a metal material, such as aluminum, or a combination, i.e., assembly, thereof. The end faces of each end cap 300a, 300b include a pair of contacts 305 for engagement with a lamp fixture. The contacts 305 are typically composed of a metal, such as aluminum, steel or copper. The contacts 305 may have a pin type geometry. To provide that the LED tube lamp 500 is compatible with T8 and T12 type lamps, the contacts 305, i.e., pins, may have a geometry that engages a G13 socket. The G13 pin type is a double pin design, in which the center to center distance between the two pins is 0.50 inches (12.7 mm), and the din diameter is 0.093 inches (2.35 mm). In some embodiments, wires (not shown) can provide electrical communication between the end caps 300a, 300b, i.e., the contacts 305 of the end caps 300a, 300, to the electrical components of the circuit board 203, such as the electronics driver 202 for the LEDs 201. In some embodiments, the wires are made of metals, and preferably made of copper or steels. Electrical junctions can be provided through mechanical fasteners, such as connectors, nut and bolt arrangements, and/or solder like connections with wires.

In some embodiments, the LED lamp 500, e.g., T8 LED hybrid tube lamp, can be used in any application or fixture that requires a compatible T8, T12 ballast or direct line voltage. In some embodiments, the design includes a mechanical safety switch 600 at both endcaps 300a, 300b, which allows the lamp to operate with the double ended connection for direct line voltage application, e.g., type B T8 lamps. The mechanical safety switch 600 protects the user from being shocked during installation of the lamp.

In some embodiments, the mechanical safety switch 600 electrically isolating the lamp 500 during installation may be a toggle switch, a pushbutton switch, and/or a selector switch. Toggle switches are actuated by a lever angled in one of two or more positions. Pushbutton switches are two-position devices actuated with a button that is pressed and released. Selector switches are actuated with a rotary knob or lever of some sort to select one of two or more positions. Like the toggle switch, selector switches can either rest in any of their positions or contain spring-return mechanisms for momentary operation. It is noted that the above examples are provided for illustrative purposes only, and are not intended to limit the types of switches that are to be used in accordance with the present disclosure. Any switch used to interrupt the flow of electric current in a circuit can be suitable for use as a switch 600 for ensuring that the lamp 500 is electrically isolated during installation so that the installer is not subjected to shock. In one example, a simplest type of switch is one where two electrical conductors are brought out of contact with each other by the motion of an actuating mechanism.

Although the mechanical safety switch 600 is depicted as being mounted on the sidewalls of the end caps 300a, 300b, embodiments have been contemplated, in which the mechanical safety switch 600 is mounted on the face of the end caps 300a, 300b through which the pins for the G13 connector extend.

Figure 5:
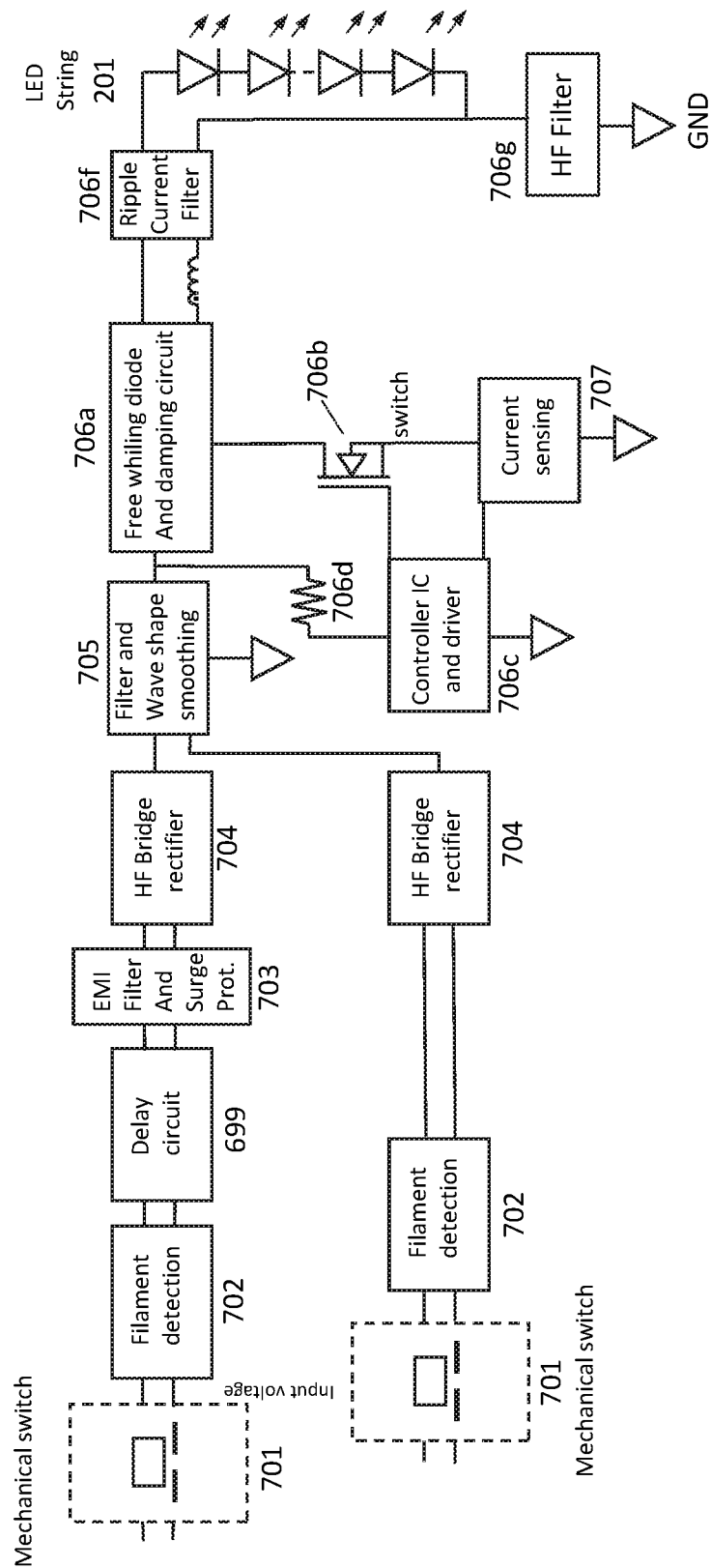
FIG. 5 is a block/circuit diagram illustrating at least a portion of the electronics package for the light emitting diode (LED) tube that has been described with reference to FIGS. 1-4.

Further details of the light source 200, e.g., string of light emitting diodes (LEDs) 201, the mechanical safety switch 600, and the driver 202 are now described in more detail with reference to the electronics package 700 for the light emitting diode (LED) tube lamp 500 that is depicted in FIG. 5.

Referring to FIG. 5, the electronics package 700 for the light emitting diode (LED) tube lamp 500 employs a driver design that will convert the input high frequency or line frequency alternating voltage and current to a suitable DC voltage and current to drive the LED string 201 inside the lamp 500. In one embodiment, the electronics package 700 may include a mechanical switch portion 701, a filament detection portion 702, an EMI filter and surge protection portion 703, a high frequency (HF) bridge rectifier 704, a filter and wave shape smoothing portion 705, a switching converter 706, a current sensing portion 707, and LED strings 201.

The mechanical switch portion 701 of the electronics package 700 is a safety switch on the lamp to help avoid electrical shock to the user (for type B applications and in instance where they are trying to install with power on). The mechanical switch arrangement is such that it only allows to be switched on only when both the end cap pins 305 of the tube are inserted & seated properly in to the lamp socket. The mechanical switch portion 701 of the electronics package 700 ensures that the power is drawn from the source only when the mechanical switch portion 701 is turned on and the lamp is seated properly in the sockets of the fixture.

The filament detection portion 702 of the electronics package 700 has a passive resistor-capacitor circuit (RC circuit) that simulates the filament load of the traditional florescent lamp. For type A applications, i.e., type A T8 lamps, the impendence is adjusted to allow for a smooth startup when operated with high frequency (HF) ballasts and also improves the ballast compatible. Type A applications may have an electronic ballast. The filament detection portion 702 provide for high voltage and current for start up conditions for the type A application, i.e., type A T8 lamps. Following start up, the voltage and current in a type A applications, i.e., type A T8 lamps, will be reduced to a normal operating range. With Type B applications (line voltage), i.e., no ballast, this circuit does not play any role. The filament detection portion 702 of the electronics package is further described below with reference to FIG. 6.

Referring to FIG. 5, the depicted circuit improves the ballast compatibility. As described throughout, the circuit depicted in FIG. 5 can help the ballast to replicate the florescent lamp starting method with a light emitting diode (LED) load in place, e.g., LED string 201.

In some embodiments, the ballast starts with a florescent lamp lighting arrangement by providing a high voltage called the "ignition voltage" to emit the electrons from its cathode. During the ignition phase, the ballast provides a high voltage, and some of the ballast topology is designed to sense this voltage and create a "start up" voltage for its associated section inside the ballast. In some examples, with the LED load, e.g., LED string 201, this ignition phase may no more be available, as it could not replicate the florescent lamp filament characteristic, and the LED will turn ON when it get a biased voltage more than its forward voltage. This can cause the LED tube not to turn ON, in which some ballasts are designed to follow the voltage sensing from the ignition voltage.

Referring to FIG. 5, in some embodiments, by implementing a delay circuit 699, the structures described herein can help to create open circuit between ballast and load for a short time. This can force the ballast to go to the ignition phase and to create a high voltage for the short time. This can contribute to providing the proper start up voltage to the associated circuit inside the ballast. In this instance, the start up method with the LED lamp, e.g., LED string 201, can be like that of a florescent lamp.

In some embodiments, the delay circuit 699 can be designed as a timer activated when it receives a threshold voltage. The timer out put can be gated to a switching MOSFET when receiving the threshold voltage, which is connected in series with filament detection 702 and driver. For a short time, the MOSFET will turn OFF and provide an open circuit. After the time lapse, the MOSFET can gated with associated circuit to turn ON, allowing the normal operation. All these associated circuit and MOSFET can be integrated in to a single chip.

The EMI Filter and Surge protection portion 703 of the electronics package 700 can play a significant role during direct line voltage (Type B) application. EMI circuit filters the high frequency noise generated by down stream converter from entering the mains input terminals of line and neutral. The surge protector protects the lamp from the surges caused by events such as lightning and line disturbances from the mains grid.

The HF Bridge Rectifier portion 704 of the electronics package 700 is high frequency rectifier which rectifies the AC input voltage from all the source i.e. from line voltage or from ballast (both electronic and magnetic) and convert it to pulsating DC. The rectifiers used are fast recovery type of didoes. During HF ballast application, as the input voltage from the ballast are high frequency thus its extremely important to use the fast recovery diode for the smooth rectification.

The Filter and Wave Shape Smoothing portion 705 of the electronics package 700 provides additional filter circuits that removes any high frequency signal from the low frequency waveform during line voltage and magnetic ballast applications. It also helps to smooth the wave shape for the down stream converter in case of magnetic ballast application.

The Filter and Wave Shape Smoothing portion of the electronics package 700 is based on a buck converter topology and contains free whiling diode 706a, switch 706b, controller IC 706c, starting resistor 706d, switching inductor 706e and ripple current filter 706f. This section generates the required voltage and current as per the need of the LED strings 201. In some embodiments, this is a constant current control mechanism that maintains a constant current to the LED string 201 in spite of change in input voltage. The high frequency filter 706g at the LED return path helps in fine tuning the high frequency noise in the output current.

The current sensing portion 707 of the electronics package 700 senses the switching inductor current which represents the LED current and provides the feedback to the controller IC according to which the frequency of operation or the ON time of the switch is adjusted to maintain a constant LED current.

The block diagram/circuit diagram further depicted the LED strings 201. The number of LEDs, number of LED strings, their color temperature etc. are chosen based on the requirement for the light output characteristics. These LED strings are driven by the voltage and current generated by the buck converter.

Figure 6:
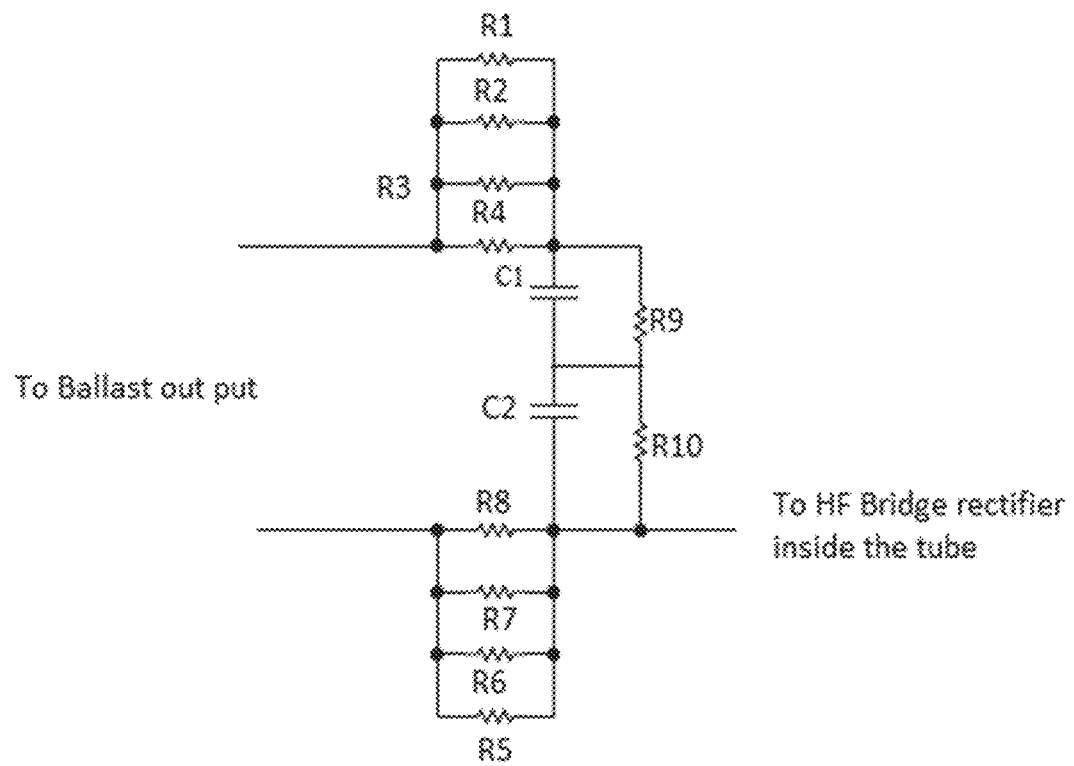
FIG. 6 is a circuit diagram for the filament detection circuit that is depicted in the block/circuit diagram that is depicted in FIG. 5.

FIG. 6 is a circuit diagram for the filament detection circuit, i.e., filament detection portion 702, that is depicted in the block/circuit diagram that is depicted in FIG. 5. The ballasts in Type A applications are designed to provide high frequency & high voltage to the filament of a traditional fluorescent lamp during lamp start up. The filament of the traditional lamp is resistive in nature.

The values of resistors R1, R2, R3, R4, R5, R6, R7, R8, R9, R10 and the capacitors C1, D2 are chosen such way that the circuit replace the cathode resistance of the traditional florescent lamp, sustains the high voltage start up and exhibits a low impendence during normal operation of the ballast.

In some examples, during startup, i.e., high voltage start up, the ballast provides a high voltage close 600 Vms constant as its open circuit voltage. Ballasts are designed to provide this voltage (>600 Vrms) when they powered on the florescent lamp in order to heat up the cathode filament of the florescent lamp so that it can emits the electrons and ignite the lamp. This is the characteristic of a florescent lamp with LED lamp, in which this voltage is not required to ignite the LEDs. However, the ballasts are able to enter in to this high voltage strike, which is close to 600 Vms.

In some embodiments, the starting method of the ballast is to detect the filament of a florescent lamp. Each florescent lamp is having a cathode filament. For 32 W florescent lamp, the cathode filament impedance is close to Rsub ~12Ω and having a Rc(cold resistance)/Rh(hot resistance)~3.4Ω. In designing the LED lamp, the resistor capacitor (RC) network is chosen to replace this impedance of the florescent lamp, so that ballast can understand there is a cathode resistance present, and thus can start its accessories circuit. This impedance is the low impendence during normal operation of the ballast.

This will help ballast to get a proper start up current to turn on the IC and other start up circuit inside the ballast. Each end of the LED tube 100, e.g., at the cap 300a, 300b has this filament circuit available.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Spatially relative terms, such as "forward", "back", "left", "right", "clockwise", "counter clockwise", "beneath," "below," "lower," "above," "upper," and the like, can be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs.

Having described preferred embodiments of methods and structures relating to hybrid light emitting diode tube, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A lamp comprising:
   a light source including at least one string of light emitting diodes on a printed circuit board present within a tube body;
   end caps having pin contacts on each end of the tube body;
   an electrical isolation switch mounted on at least one of the end caps, wherein the electrical isolation switch provides shock protection from the lamp when installed into a ballast free fixture; and
   driver electronics including a filament detector portion provided by a passive resistance capacitor (RC) circuit that simulates the filament load of a fluorescent lamp when installed into a ballast containing fixture, wherein the driver electronics comprises a delay circuit between the filament detector portion and the light source, the delay circuit includes at least one gated MOSFET transistor, wherein when the gated MOSFET transistor is OFF the circuit is open for high voltage start up consistent with the filament load of the fluorescent lamp at start up, and after the high voltage start up the gated MOSFET transistor is ON for post start up operation of the light source.

2. The lamp of claim 1, wherein the contacts have a G13 pin layout.

3. The lamp of claim 1, wherein he light emitting diodes are surface mount device (SMD) light emitting diodes.

4. The lamp of claim 1, wherein the electrical isolation switch comprises rocker switch, toggle switch, selector switch or a combination thereof.

5. The lamp of claim 1, wherein the electrical isolation switch is present on each of said end cap of the lamp.

6. The lamp of claim 1, wherein the ballast containing fixture comprises a high frequency (HF) ballast, a magnetic ballast, an instant start ballast, a programed start ballast or combination thereof.

7. The lamp of claim 1, wherein when installed into the ballast free fixture, the lamp works on a direct line voltage of 120V/277V.

8. A lamp comprising:
a light source including at least one string of light emitting diodes on a printed circuit board present within a tube body;
end caps having contacts with a G13 pin layout on each end of the tube body;
an electrical isolation switch mounted on at least one of the end caps, wherein the electrical isolation switch provides shock protection from the lamp when installed into a ballast free fixture for a type B T8 lamp; and
driver electronics including a filament detector portion provided by a passive resistance capacitor (RC) circuit that simulates the filament load of a fluorescent lamp when installed into a ballast containing fixture for a T12 lamp or a type A T8 lamp, wherein the driver electronics comprises a delay circuit between the filament detector portion and the light source, the delay circuit includes at least one gated MOSFET transistor, wherein when the gated MOSFET transistor is OFF the circuit is open for high voltage start up consistent with the filament load of the fluorescent lamp at start up, and after the high voltage start up the gated MOSFET transistor is ON for post start up operation of the light source.

9. The lamp of claim 8, wherein the light emitting diodes are surface mount device (SMD) light emitting diodes.

10. The lamp of claim 8, wherein the electrical isolation switch comprises rocker switch, toggle switch, selector switch or a combination thereof.

11. The lamp of claim 8, wherein the electrical isolation switch is present on each of said end cap of the lamp.

12. The lamp of claim 8, wherein the drive electronics comprise a driver that is present on each end of the circuit board.

13. The lamp of claim 8, wherein the passive resistance capacitor (RC) circuit provides a high start up voltage and low impedance following start up during normal operation when the lamp is installed into said ballast containing fixture.

14. The lamp of claim 8, wherein when installed into the ballast free fixture the lamp works on a direct line voltage of 120V/277V.

15. A lamp comprising:
a light source including at least one string of light emitting diodes on a printed circuit board present within a tube body;
end caps having pin contacts on each end of the tube body;
an electrical isolation switch mounted on at least one of the end caps, wherein the electrical isolation switch provides shock protection from the lamp when installed into a ballast free fixture; and
driver electronics including a filament detector portion provided by a passive resistance capacitor (RC) circuit, in which when installed into a ballast containing fixture provides a high voltage during start up of the lamp and low impedance following start up during normal operation of the lamp, wherein the driver electronics comprises a delay circuit between the filament detector portion and the light source, the delay circuit includes at least one gated MOSFET transistor, wherein when the gated MOSFET transistor is OFF the circuit is open for said high voltage during start up consistent with the filament load of the fluorescent lamp at start up, and after the high voltage during start up the gated MOSFET transistor is ON for operation of said light source at said low impendence.

16. The lamp of claim 15, wherein the light emitting diodes are surface mount device (SMD) light emitting diodes.

17. The lamp of claim 15, wherein the electrical isolation switch comprises rocker switch, toggle switch, selector switch or a combination thereof.

18. The lamp of claim 15, wherein the electrical isolation switch is present on each of said end cap of the lamp.

19. The lamp of daim 15, wherein the ballast containing fixture comprises a high frequency (HF) ballast, a magnetic ballast, an instant start ballast, a programed start ballast, an electronic RS ballast or combination thereof.

20. The lamp of claim 15, wherein when installed into the ballast free fixture works on a direct line voltage of 120V/277V.

* * * * *